J. A. OSBORN.
ELECTRIC WELDING TONGS.
APPLICATION FILED MAR. 18, 1911.
1,042,467.
Patented Oct. 29, 1912.
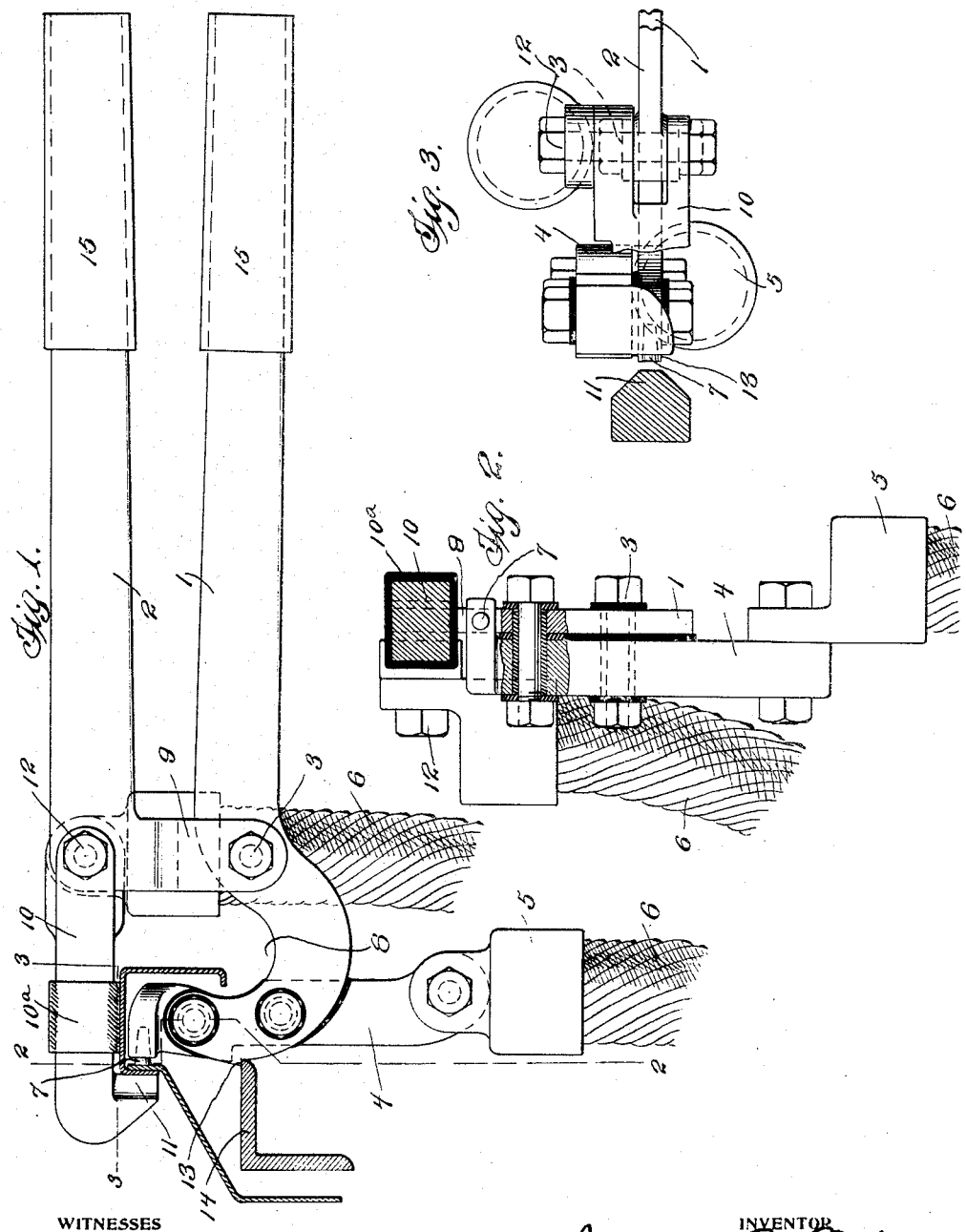
WITNESSES
INVENTOR
Joseph A. Osborn
ATTORNEY

UNITED STATES PATENT OFFICE.

JOSEPH A. OSBORN, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

ELECTRIC WELDING-TONGS.

1,042,467.  Specification of Letters Patent.  Patented Oct. 29, 1912.

Application filed March 18, 1911. Serial No. 615,402.

*To all whom it may concern:*

Be it known that I, JOSEPH A. OSBORN, residing at 915 Olive street, St. Louis, Missouri, and being a citizen of the United States, have invented certain new and useful Improvements in Electric Welding-Tongs, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a side elevational view of a tool constructed in accordance with this invention, the tool being shown as in operation. Fig. 2 is a vertical and elevational view partly in section on line 2—2 of Fig. 1; and Fig. 3 is a top plan view parts being broken away and shown in section on line 3—3 of Fig. 1.

This invention relates to an electrical welding tool particularly adapted to the welding together of the parts of a metallic window sill such as are commonly employed in steel car construction and has for its principal object the provision, in such a tool, of means for reaching into the under-recesses of the sill so as to be brought into operative relation with otherwise inaccessible parts.

With this and other objects in view the invention comprises a pair of pivotally connected handles one of said handles being rigidly connected, beyond said pivot, to an insulated member comprising one electrode of the tool and the other of said handles being adapted to support the opposite electrode in such manner that the closing or bringing together of the handles will bring said electrodes into closer relation. The electrode carried by the last mentioned handle is so connected to said handle that it may be removed or swung away from operative position so that the tool may be readily removed from the work, and owing to the smallness of the space within which the said tool must operate and the necessity for considerable compression at the welding point, the operative elements of the tool are so arranged relatively that the radial movement of the handles transmits reciprocating motion to the jaws at the point of weld in such a manner that the compression at the jaws is multiplied in proportion to the radial movement of the handles. This is accomplished by a relative shifting of the main pivot to lengthen the leverage of the handle insulated from and carrying one electrode by a radial movement of the other lever around said pivot and by the lateral movement of the movable extension member, which is in direct electrical connection with the other electrode. It will be observed, however, that the tool is not limited to use in connection with the welding together of parts of a window sill, but is equally well adapted to a great variety of uses.

Referring to the drawings, the numerals 1 and 2 represent the operating handles and 3 the pivot and connecting bolt.

The handle 1, beyond the bolt 3, is rigidly connected to the insulated member 4 and said insulated member depends below said handle and has fixed to the lower end thereof a terminal 5 adapted to receive the end of one of the conductors 6 from the transformer. The transformer referred to is such as is commonly used in connection with welding devices of this character and therefore is not illustrated. The upper end of the member 4 is provided with a removable electrode 7 which projects laterally from said member in a plane parallel with the longitudinal axis of the handle 1. Intermediate the member 4 and the pivot 3, the handle 1 is formed into a depression as at 8 adapted to accommodate a portion of the work which may over-hang the upper end of the member 4. (See Fig. 1.) Adjacent the pivot bolt 3 the handle 2 is formed with a portion 9 which extends radially from said pivot and at approximately right angles to the major portion of the handle 1. The major portion of the handle 2 extends laterally from the radial portion 9 and lies normally approximately parallel with the handle 1, so that the two handles are disposed in such manner as to be readily grasped by the hand of an operator.

Pivotally connected to the outer end of the portion 9 of the handle 2 is an extension member 10 of said handle. The outer or free end of said extension member is formed with a laterally projecting lip 11 comprising the opposite electrode of the tool. When in operative position the lip 11 is adapted to lie directly in an alinement with the electrode 7. A band of insulating material 10ᵃ is fitted about an intermediate portion of the member 10 and serves the double purpose of insulating said member from the work and as a handle by which said member may be grasped when it is desired to swing the same upon its pivot for removing the tool from the work. Fixed to the pivot 12 and to the adjacent end of the member 10 is a terminal adapted to receive the end of the opposite conductor 6 from the transformer. Adjacent the insulated member 4 the handle 1 is formed with a laterally projecting shoulder 13 adapted to rest upon, and slide along, the edge of a suitable table 14 which table may be an element of the article operated upon or may be specially provided as found desirable.

It will be understood from the foregoing that in order to bring the tool into operative relation with the work the extension member 10 of the handle 2 will be thrown backward about its pivot so as to permit insertion of the electrode 7 into an operative position beneath the work and relatively to permit entrance of portions of said work into the depression 8 of the handle 1. The shoulder 13 is brought to rest upon the edge of table 14 in such manner that the tool may be moved bodily lengthwise of said table and the electrode 7 will be held constantly in position against the inner side of the seam being welded. The extension member 10 is then thrown forward so that the electrode 11 will assume its proper co-working position with the electrode 7. Pressure of the handles toward each other will obviously hold said electrodes firmly against opposite sides of the seam.

It will be understood of course, that in operation, that the current of electricity will pass from one of the conductors 6 into the insulated member 4, thence through the electrode 7, through the intervening portions of the work, through the electrode 11 of the extension 10 and thence into the opposite conductor 6. Suitable insulated hand-grips as 15 may be fitted upon the free ends of the handles if desired.

Having thus described my invention what I claim as new and desire to secure by Letters Patent is:—

1. In a welding tool, a lever connected with an electrical terminal at one end and provided with a handle at the opposite end, an angular lever having one of its legs pivoted to the first lever intermediate the length thereof and provided with a handle on the other leg, an extension member pivoted to the apex of the angular lever and connected with an electrical terminal.

2. In a welding tool, a lever provided with a welding jaw and connected with an electrical terminal at one end and provided with a handle at the opposite end, an angular lever having one of its legs pivoted to the first lever intermediate the length thereof and provided with a handle on the other leg, an extension member pivoted to the apex of the angular lever and connected with an electrical terminal.

3. In an electric welding tool, a pair of pivotally connected operating handles, an insulated member fixed to one of said handles upon one side of said pivot, a portion formed upon said other handle disposed to project radially from said pivot, and an extension member connected to the outer end of said radial portion adapted to be moved into and out of operative relation with said insulated member.

4. In a welding tool, a lever connected with an electrical terminal at one end and provided with a handle at the opposite end, an angular lever having one of its legs pivoted to the first lever intermediate the length thereof and provided with a handle on the other leg, an extension member pivoted to the apex of the angular lever and provided with a welding jaw and connected with an electrical terminal.

5. In an electric welding tool, a pair of pivotally connected operating handles, an insulated member fixed to one of said handles upon one side of said pivot, a depression formed in said last mentioned handle intermediate said insulated member and said pivot adapted to accommodate a portion of the article to be welded, a removable member carried by said other handle adapted to coöperate with said insulated member, and electrical connections with said removable member and with said insulated member whereby an electric current may be passed from one of said members to the other through the work to be welded.

6. In an electric welding tool, the combination with a pair of pivotally connected operating handles, and an insulated electrode fixed to one of said handles upon one side of said pivot, of a table, a shoulder formed upon said handle adapted to rest upon said table, said shoulder being adapted to be moved along said table for maintaining said electrode in operative position, and an electrode carried by said other handle adapted to be moved into co-working relation with said first electrode.

7. In an electric welding tool, the combination with a pair of pivotally connected operating handles, and an insulated electrode fixed to one of said handles upon one side of said pivot, of a table, a shoulder formed upon said handle adapted to rest upon said table, said shoulder being adapted to be moved along said table for maintaining said electrode in operative position, and a pivotally mounted electrode carried by said other handle adapted to be swung into co-working relation with said first electrode.

8. In a welding tool, an angular member, a lever provided with a welding jaw pivoted intermediate its length to the leg of said angular member, an extension member pivoted to the apex of the angle of said angular member and provided with a welding jaw comprising a projection lip and electrical terminals in connection with each of said levers.

9. In a welding tool, a pair of welding jaws, levers provided with electrical connections and with operating handles, an angular extension on one of the levers and an extension member pivoted thereto, the said levers being adapted to operate radially to reciprocate the electrical terminals.

10. In a welding tool, welding means comprising a lever with an angular extension, a lever pivoted intermediate of its length in said extension and an angular extension member pivoted in the apex of the angle of said angular extension member, electrical connections for each of said levers and operating handles therefor, whereby the same are operated radially to reciprocate the welding means.

In witness whereof I have hereunto set my hand in the presence of two witnesses.

JOSEPH A. OSBORN.

Witnesses:
CHARLOTTE E. MITZE,
J. H. BRUEGGEMAN.